June 28, 1960  C. ALINARI  2,942,798
FISHING REEL

Filed July 5, 1955  2 Sheets-Sheet 1

INVENTOR.
Carlo Alinari
BY

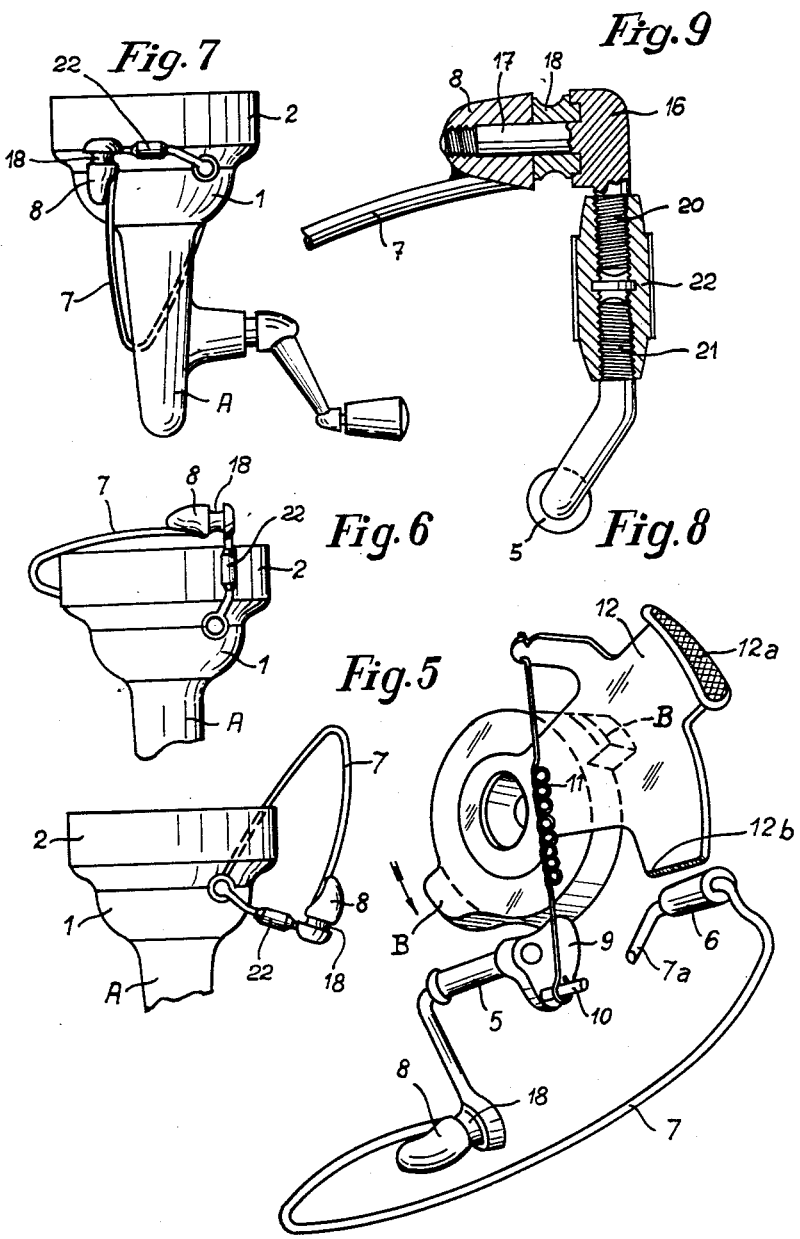

United States Patent Office 2,942,798
Patented June 28, 1960

2,942,798
FISHING REEL

Carlo Alinari, Turin, Italy, assignor to Edel Rolandi, Turin, Italy

Filed July 5, 1955, Ser. No. 520,019

Claims priority, application Italy July 16, 1954

2 Claims. (Cl. 242—84.2)

This invention relates to a fishing reel.

It is the main object of this invention to provide a fishing reel in which the line pick-up is mounted for oscillation about a shaft orthogonal to the axis of the flyer, said shaft being provided with a cam cooperating with projections on the cover for releasing the pick-up to snap to its line picking-up position under the action of a tension spring which is substantially orthogonal both to the axis of oscillation of the pick-up and of rotation of the flyer.

A further object of this invention is to provide the flyer with an oscillating lever carrying the attachment for said spring and having a finger cooperating with a bent over end of the pick-up for retaining the latter in its picking-up position. By displacing the lever the pick-up can be brought to its inoperative position against the casing of the fishing reel to minimise the overall size of the latter.

The flyer is divided into two halves enclosing a seating for the transverse shaft about which the pick-up oscillates.

Further characteristic features of this invention will be understood from the following detailed description referring to the accompanying drawings which show by way of example an embodiment thereof.

Figure 1:
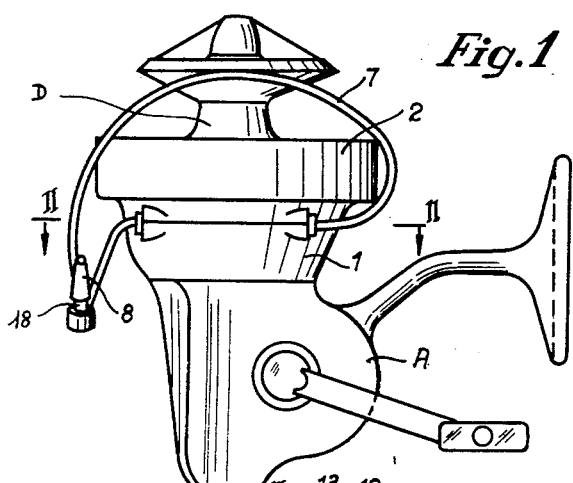
Figure 2:
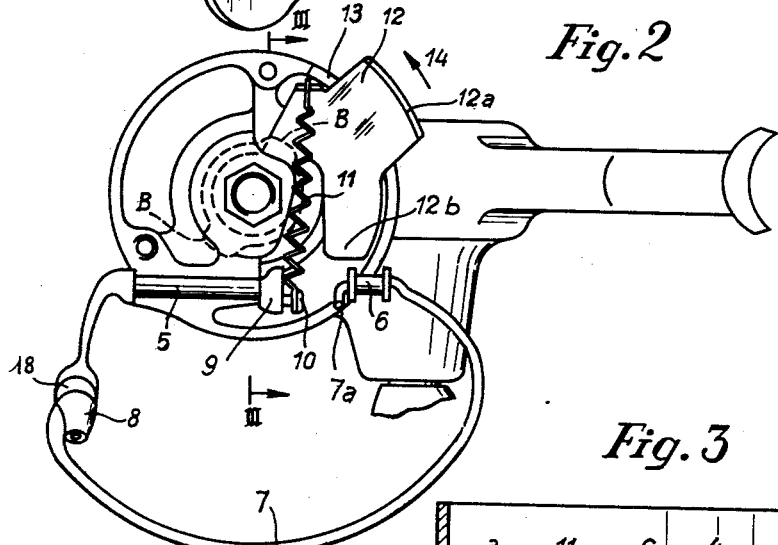
Figure 4:
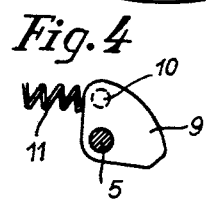
Figure 3:
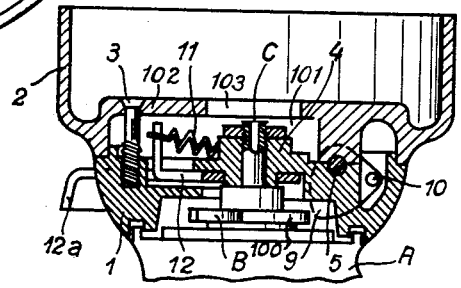

Figure 1 is an elevational view of the fishing reel, the pick-up being in its line throwing position, Figure 2 is a sectional view on line II—II of Figure 1, Figure 3 is a sectional view on line III—III of Figure 2, Figure 4 illustrates a detail of Figure 3 in the line picking-up position, Figures 5 to 7 show diagrammatically the line pick-up in its positions for throwing the line, rewinding the line and transport, respectively, Figure 8 is a perspective view of the snap means for the pick-up.

Figure 9 is a detail view on an enlarged scale of a portion of the line pick-up.

A denotes the casing of the fishing reel to which is secured a collar 100 of circular shape provided with two projections B on its outer periphery arranged about the shaft C rotatably mounted in the casing A and carrying the flyer. The flyer is divided into two sections 1 and 2 axially connected by means of two screws 3. The sections 1 and 2 of the flyer are each of substantially annular shape and enclose therebetween a chamber 101 in which the mechanism controlling the operation of the line pick-up 7 carried by the flyer is enclosed. The chamber 101 is open at its side facing the casing A of the fishing reel and is closed at its opposite side by a transversally extending wall 102 of the section 2 of the flyer provided with a central bore 103. The section 1 of the flyer is provided with a central hub 4 for attachment thereof about the shaft C which is driven by mechanism of known type enclosed within the casing A of the fishing reel.

Two cylindrical transverse seatings are formed between the two flyer sections 1, 2, said seatings being orthogonal to the shaft C and adapted to receive a spindle 5 and a bush 6 coaxial therewith, respectively. The spindle 5 is securely fixed through a line guide roller 18 to one end of the line pick-up 7, the other pick-up end being guided within the bush 6 and ending in a bent-over extension 7a, of which the function will be explained hereafter.

The end of the spindle 5 enclosed within the flyer is provided with a cam 9 having attached thereto a pivot 10 for anchoring the end of a tension spring 11 arranged substantially orthogonal both to the spindle 5 and shaft C of the flyer. The other end of the spring 11 is anchored to an operating lever 12 oscillating about the hub 4 of the flyer, guided within a slot 13 in the section 1 of said flyer and provided externally with a bent-over section 12a for operation. The lever 12 carries an extension 12b enclosed within the flyer and adapted to cooperate with the end 7a of the line pick-up.

During use of the fishing reel the line pick-up 7 can take two positions, as shown in Figure 5 for cocking and throwing of the line and in Figure 6 for picking-up the line, respectively.

When the pick-up is in its cocking and throwing position, as shown in Figures 1, 2, 3 and 5, the pivot 10 for anchoring the spring 11 is below the axis of the spindle 5, the spring 11 maintaining the cam 9 in its position shown in Figure 3, so that it can be acted upon by projections B on the casing of the fishing reel upon rotation of the flyer.

By acting on the cam 9 the projections B on the casing of the fishing reel overcome the action of the spring 11 and oscillate the cam together with the spindle 5 and pick-up 7. As soon as the anchoring pivot 10 for the spring comes above the axis of the spindle 5 the spring acts to assist the further oscillation of the pick-up till the latter reaches its line picking-up position shown in Figure 6, in which the extension 7a on the pick-up abuts the extension 12b on the operating lever.

In order to place the pick-up in its position for transport (see Figure 7) the operating lever 12 should be acted upon and moved in the direction of the arrow 14 so as to release the end 7a of the pick-up from the extension 12b on the lever, thereby permitting an additional oscillation of the pick-up under the action of the spring 11 till the pick-up is fully tilted over to its position for transport to the minimum size of the fishing reel.

Referring to Figure 9, the line pick-up 7 is provided with means for adjusting the spacing in an axial direction of the line guide roller and flyer. The end of the pick-up 7 is connected to the spindle 5 through an intermediate member 16 provided with two screw-threaded extensions 17 and 20 perpendicular to one another. A line guide roller 18 is arranged about the extension 17 and is held in position by means of a nut 8 screwed on the screw-threaded end of the extension 17 and securedly fixed to the end of the pick-up 7.

The extension 20 is connected by an adjusting sleeve 22 to a screw-threaded extension 21 securedly fixed to the spindle 5 and arranged orthogonally to the spindle.

The screw-threads on the extensions 20, 21 are oppositely handed, so that by rotating in either direction the sleeve 22 the spacing between the line guide roller 18 and pivot 5 of oscillation of the pick-up can be adjusted, thereby adjusting the spacing in an axial direction between the flyer and line guide roller.

This adjustment permits of arranging the line guide roller 18 in the most suitable position for satisfactory winding up of the line.

What I claim is:

1. In a fishing reel a casing, a rotatable shaft projecting from said casing, a hollow flyer adjacent said casing, means for securing said flyer to said shaft, a collar fast with said casing and surrounding that part of said shaft which is adjacent said casing, at least one cam-like projection on the outer periphery of said collar, a rotatable spindle supported in said flyer, said spindle having its axis arranged in a diametral plane perpendicular to the axis of said shaft and being offset thereto in radial direction of the flyer and having one end thereof projecting outwardly from the flyer and its other end situated inwardly of the latter near the diametral plane thereof perpendicular to said spindle, a bush having a portion inside said flyer facing the end of said spindle situated inwardly of the flyer and being coaxial with said spindle and axially spaced therefrom, a line pick-up having one end portion secured to the end of said spindle projecting outwardly from the flyer and its other end rotatably supported by said bush, a cam fast with the end of said spindle situated inwardly of the flyer, a pin frontally projecting from said cam towards said bush and eccentrically arranged with respect to said spindle, a helical tension spring secured at one end to said pin and arranged substantially orthogonally both to said spindle and said shaft and arranged at the side of said diametral plane of the flyer opposite to that in which the spindle is supported, means rotatable together with the flyer arranged substantially at the zone of the flyer diametrically opposite that at which the cam is provided for anchoring the other end of said helical spring, said cam being so shaped and said pin being arranged on said cam in such manner that the latter is pressed against the collar periphery by the action of said helical tension spring when the line pickup is brought in its line throwing position and upon the rotation of the flyer said cam-like projection on the periphery of said collar urges said cam and rotates the latter against the action of said tension spring until the pin on the cam reaches such a position that the rotation of the cam continues under the action of the tension spring swinging thereby the line pick-up towards its line picking-up position, and means for preventing the line pick-up from overcoming its line picking-up position under the action of said tension spring.

2. A fishing reel as set forth in claim 1, wherein said other end of said helical tension spring is secured to a projection of a flat lever arranged within said flyer, said flyer having a peripheral slot, said lever having a portion projecting outwardly from the flyer through said slot and a projection extending toward the line pick-up end supported in said bush, said end having a bent-over extension engaging said lever extension when the line pick-up is in its line picking-up position, one end of said slot forming an abutment acting as stop means for preventing the rotation of said lever under the action of said tension spring, while said slot has a length such as to permit oscillating said lever towards a position in which its projection is out of the path on the bent-over extension at the said end of the pick-up.

References Cited in the file of this patent

UNITED STATES PATENTS

| | | |
|---|---|---|
| 2,568,986 | Brown | Sept. 25, 1951 |
| 2,599,189 | Mauborgne | June 3, 1952 |
| 2,797,055 | McDonald | June 25, 1957 |

FOREIGN PATENTS

| | | |
|---|---|---|
| 957,937 | France | Aug. 29, 1949 |